United States Patent [19]

Inoue et al.

[11] Patent Number: 5,026,767

[45] Date of Patent: Jun. 25, 1991

[54] ANTISTATIC AROMATIC POLYIMIDE ARTICLE

[75] Inventors: Hiroshi Inoue; Tadashi Miura; Tetsuji Hirano, all of Hirakata, Japan

[73] Assignee: Ube Industries, Ltd., Ube, Japan

[21] Appl. No.: 554,152

[22] Filed: Jul. 13, 1990

Related U.S. Application Data

[62] Division of Ser. No. 202,131, Jun. 2, 1988, abandoned.

[30] Foreign Application Priority Data

Jun. 3, 1987 [JP] Japan .................. 62-139169

[51] Int. Cl.$^5$ .............................. C08K 5/41
[52] U.S. Cl. .................... 524/745; 524/161; 524/170; 524/742; 524/743; 524/912
[58] Field of Search .......... 524/161, 170, 912, 742, 524/743, 745

[56] References Cited

U.S. PATENT DOCUMENTS

| | | | |
|---|---|---|---|
| 4,450,249 | 5/1984 | Schmidt et al. | 524/161 |
| 4,544,622 | 10/1985 | Kausch | 430/276 |
| 4,551,494 | 11/1985 | Lohmeijer | 524/161 |
| 4,732,815 | 3/1988 | Mizobuchi et al. | 428/484 |

FOREIGN PATENT DOCUMENTS

| | | | |
|---|---|---|---|
| 47071 | 4/1977 | Japan | 524/161 |
| 57-744 | 4/1982 | Japan | 524/161 |
| 38123 | 2/1985 | Japan | 524/161 |
| 1066731 | 4/1986 | Japan | 524/161 |
| 2011759 | 1/1987 | Japan | 524/161 |

Primary Examiner—Melvyn I. Marquis
Assistant Examiner—David W. Woodward
Attorney, Agent, or Firm—Frishauf, Holtz, Goodman & Woodward

[57] ABSTRACT

An antistatic aromatic polyimide article comprises an aromatic polyimide and a small amount of an antistatic agent. The antistatic agent is a sulfonate having the formula (I):

$$R(SO_3M)_n \qquad (I)$$

wherein R is a substituted or unsubstituted aryl group; M is an alkali metal; and n is 1 or 2; or a sulfinate having the formula (II):

$$RSO_2M \qquad (II)$$

wherein R and M have the same meanings as defined above.

8 Claims, No Drawings

ANTISTATIC AROMATIC POLYIMIDE ARTICLE

This application is a division of application Ser. No. 07/202,131, filed June 2, 1988, now abandoned.

BACKGROUND OF THE INVENTION

1. Field of the Invention

The present invention relates to an antistatic aromatic polyimide article, and more particularly to an aromatic polyimide article which is improved in antistatic properties as well as in heat resistance and mechanical properties and a process for the preparation of the same.

2. Description of Prior Art

Plastic material articles generally tend to be electrostatically charged markedly, and hence they suffer various problems such that dust and dirt are easily deposited thereon to produce stained appearances, electrostatic charge stored therein gives shocks to a human body, or when the article is in the form of a film, the film decreases in slip properties to lower smooth running properties or to cause troubles in handling procedure.

In order to solve the above-mentioned problems, various proposals for imparting antistatic properties to the plastic articles have been made. For example, there is known a method of adding or coating a conductive material such as carbon black to the plastic film, or a method of incorporating into or coating an antistatic agent to the plastic film. However, those methods still have drawbacks. For example, in the former method, a large amount of the conductive material such as carbon black is required for the addition to the film, whereby the film decreases in mechanical strength or colored with black to lower its commercial value. In the latter method, the conventional antistatic agents are easily decomposed at elevated temperatures, so that they can hardly provide antistatic properties to the plastic film in the case that the process for the preparation of the film needs a heat treatment of high temperatures such as a temperature of not lower than 300° C. to enhance the heat resistance as in the case of an aromatic polyimide film.

SUMMARY OF THE INVENTION

It is an object of the present invention to provide an aromatic polyimide article (i.e., shaped article) which is almost free from the above-mentioned drawbacks and improved in antistatic properties even in the case that the process for preparing the article involves a heat treatment of high temperatures such as a temperature of not lower than 300° C.

There is provided by the present invention an antistatic aromatic polyimide article which comprises an aromatic polyimide and an antistatic agent in an amount of 0.01 to 10 parts by weight based on 100 parts by weight of the aromatic polyimide, said antistatic agent comprising being selected from the group consisting of a sulfonate having the formula (I):

$$R(SO_3M)_n \quad (I)$$

wherein R is a substituted aryl group or an unsubstituted aryl group; M is an alkali metal; and n is 1 or 2; and a sulfinate having the formula (II):

$$RSO_2M \quad (II)$$

wherein R and M have the same meanings as defined above.

The antistatic aromatic polyimide article of the present invention shows excellent antistatic properties (surface resistivity: $10^7$ to $10^{13}$ ohm) even after it is subjected to a heat treatment of high temperatures such as a temperature of not lower than 300° C. Accordingly, the present invention provides an aromatic polyimide article (e.g., an aromatic polyimide film) which is improved in antistatic properties as well as in heat resistance and mechanical properties.

DETAILED DESCRIPTION OF THE INVENTION

The aromatic polyimide used in the present invention can be prepared by a known method employing an aromatic diamine component and an aromatic tetracarboxylic acid component. For example, the aromatic diamine component and the aromatic tetracarboxylic acid component are polymerized preferably in substantially equimolar amounts in an organic polar solvent to prepare an organic polar solvent solution of an aromatic polyamic acid, and then the aromatic polyamic acid in the solution is imidized to prepare an aromatic polyimide.

Examples of the aromatic diamine components include benzene diamines such as 1,4-diaminobenzene, 1,3-diaminobenzene and 1,2-diaminobenzene, diphenyl (thio)ether diamines such as 4,4'-diaminodiphenyl ether, 3,4'-diaminodiphenyl ether, 3,3'-diaminodiphenyl ether and 4,4'-diaminodiphenyl thioether, benzophenone diamines such as 3,3'-diaminobenzophenone and 4,4'-diaminobenzophenone, diphenylphosphine diamines such as 3,3'-diaminodiphenylphosphine and 4,4'-diaminodiphenylphosphine, diphenylalkylene diamines such as 3,3'-diaminodiphenylmethane, 4,4'-diaminodiphenylmethane, 3,3'-diaminodiphenylpropane and 4,4'-diaminodiphenylpropane, diphenylsulfide diamines such as 3,3'-diaminodiphenylsulfide and 4,4'-diaminodiphenylsulfide, diphenylsulfone diamines such as 3,3'-diaminodiphenylsulfone and 4,4'-diaminodiphenylsulfone, and benzidines such as benzidine and 3,3'-dimethylbenzidine.

These aromatic diamines can be employed singly or in combination. Preferably employed as the aromatic diamine component are 1,4-diaminobenzene, 4,4'-diaminodiphenyl ether and a mixture thereof.

As the aromatic tetracarboxylic acid component, there can be mentioned aromatic tetracarboxylic acids, acid anhydrides thereof, salts thereof, and esters thereof. Examples of the aromatic tetracarboxylic acids include 3,3',4,4'-biphenyltetracarboxylic acid, 2,3,3',4'-biphenyltetracarboxylic acid, pyromellitic acid, 3,3',4,4'-benzophenonetetracarboxylic acid, 2,2-bis(3,4-dicarboxyphenyl)propane, bis(3,4-dicarboxyphenyl)methane, bis(3,4-dicarboxyphenyl)ether, bis(3,4-dicarboxyphenyl)thioether, bis(3,4-dicarboxyphenyl)phosphine, and bis(3,4-dicarboxyphenyl)sulfone.

These aromatic tetracarboxylic acids can be employed singly or in combination. Preferred is an aromatic tetracarboxylic dianhydride, and particularly preferred are 3,3',4,4'-biphenyltetracarboxylic dianhydride, pyromellitic dianhydride and a mixture thereof.

As the organic polar solvent employable in the polymerization reaction, there can be mentioned solvents capable of homogeneously dissolving monomers (aromatic diamine component and aromatic tetracarboxylic acid component), an oligomer produced by monomers (aromatic diamine component and aromatic tetracarboxylic acid component), or a low molecular weight polyamic acid. Examples of such organic polar solvents include amide solvents such as N,N-dimethylformamide, N,N-dimethylacetamide, N-methyl-2-pyrrolidone and N-methylcaprolactam, dimethylsulfoxide, hexamethylsulfolamide, dimethylsulfone, tetramethylenesulfone, dimethyltetramethylenesulfone, pyridine, ethylene glycol, tetramethylurea, cresol, and phenol. These organic polar solvents can be used in combination with other solvents such as benzene, toluene, benzonitrile, xylene, solvent naphtha and dioxane.

The content of the aromatic polyamic acid (including monomer components) in the organic polar solvent solution prepared as above is preferably in the range of 3 to 40 wt. %, more preferably in the range of 4 to 35 wt. %. The aromatic polyamic acid preferably has a logarithmic viscosity (measured at 30° C., concentration: 0.5 g/100 ml of solvent) of not less than 0.1, more preferably not less than 0.2.

The antistatic agent used in the present invention is selected from the group consisting of a sulfonate having the aforementioned formula (I) and a sulfinate having the aforementioned formula (II).

The sulfonate has the formula (I):

$$R(SO_3M)_n \qquad (I)$$

wherein R is a substituted aryl group or an unsubstituted aryl group; M is an alkali metal; and n is 1 or 2.

R in the formula (I) preferably is a phenyl group, a naphthyl group, a phenyl group substituted with a lower alkyl group having 1–4 carbon atoms, or a naphthyl group substituted with the same. M in the formula (I) preferably is sodium, lithium or potassium. Examples of the sulfonates include sodium benzenesulfonate, sodium toluenesulfonate, lithium toluenesolfonate, sodium naphthalenesulfonate and disodium 2,6-naphthlenedisulfonate.

The sulfinate has the formula (II):

$$RSO_2M \qquad (II)$$

wherein R and M have the same meanings as defined above.

Examples of the sulfinates include sodium benzenesulfinate and sodium toluenesulfinate.

The antistatic agent of the invention is required to be contained in an amount of 0.01 to 10 parts by weight, preferably 0.05 to 2 parts by weight, based on 100 parts by weight of the aforementioned aromatic polyimide. When the amount of the antistatic agent is less than the lower limit of the above-specified range, the antistatic properties of the resulting polyimide article (e.g., film) become unsatisfactory. Even when the amount thereof exceeds the upper limit of the above-specified range, the antistatic properties of the resulting polyimide article hardly increases, while the article tends to deteriorate in mechanical strength or surface smoothness.

A method of preparing an aromatic polyimide article from an organic polar solvent solution of an aromatic polyamic acid is generally known. The antistatic aromatic polyimide article of the present invention can be basically prepared utilizing the known method, that is, the above-mentioned antistatic agent is incorporated into the organic polar solvent solution of the aromatic polyamic acid at an optional stage to prepare a polyamic acid solution containing the antistatic agent, and using the solution the antistatic aromatic polyimide article of the invention is prepared.

The process for the preparation of the antistatic aromatic polyimide article of the invention will be described in more detail hereinafter referring to the case that the article is in the form of a film.

A self-supporting film is prepared from an organic polar solvent solution of an aromatic polyamic acid which contains the aforementioned antistatic agent through a casting method. The self-supporting film is heated at a temperature of not lower than 300° C. to form an antistatic aromatic polyimide film.

The antistatic agent can be added at an optional stage for the preparation of the organic polar solvent solution of an aromatic polyamic acid. For example, the antistatic agent may be initially added to an organic polar solvent prior to performing polymerization reaction of the aromatic tetracarboxylic acid component and the aromatic diamine component, or may be added at the stage of the polymerization reaction of those components in the solvent. Otherwise, the antistatic agent may be added to the aromatic polyamic acid solution obtained after the polymerization reaction.

There is no specific limitation on the addition procedure of the antistatic agent, and any known procedure can be employed. For example, the antistatic agent may be initially pulverized by means of a pulverizing device such as a ball mill, and the pulverized antistatic agent is then added to the organic polar solvent or the aromatic polyamic acid solution. Alternatively, after adding the antistatic agent to the organic polar solvent, the antistatic agent may be subjected to ultrasonic pulverization in the solvent.

The self-supporting aromatic polyimide film can be produced from the organic polar solvent solution of an aromatic polyamic acid containing the antistatic agent by any of known processes. For example, the organic polar solvent solution of an aromatic polyamic acid containing the antistatic agent is filtered and defoamed, and the solution is uniformly cast over an appropriate support such as a metallic drum and a metallic belt by means of a T-die. The solution cast over the support is then heated at a temperature of not higher than 200° C., preferably 60° to 160° C., by applying a hot air, infrared rays, etc. to gradually remove the solvent from the solution. Thus, a self-supporting film can be prepared.

The self-supporting film preferably has a volatile material loss on heating (i.e., heating loss) of 5 to 60 wt. %, more preferably 7 to 55 wt. %. For determining the heating loss, the self-supporting film is dried at 420° C. for 20 minutes. The weight of the film measured prior to the drying ($W_1$) and the weight thereof measured after the drying ($W_2$) are introduced into the following equation to determine the heating loss.

$$\text{Heating loss (wt.\%)} = [(W_1 - W_2)/W_1] \times 100$$

Subsequently, the self-supporting film is subjected to a heat treatment at a temperature of not lower than 300° C., preferably 300° to 550° C., more preferably 300° to 500° C.

In the heat treatment, it is unfavorable to raise the temperature too rapidly, because the solvent is removed from the film and imidation reaction proceeds by the time the temperature reaches the above-defined range. The time for the heat treatment preferably is in the range of 0.5 to 60 minutes. The heat treatment is preferably carried out at a temperature of not lower than 300°

C. for not shorter than 2 minutes (particularly not shorter than 3 minutes), more preferably at a temperature of not lower than 350° C. for not shorter than 1 minute (particularly not shorter than 2 minutes). When the temperature for the heat treatment is lower than the above-mentioned temperature or the time therefor is shorter than the above-mentioned time, antistatic properties of the resulting aromatic polyimide film markedly decrease. Even when the temperature for the heat treatment is higher than the above-mentioned temperature of the time therefor is longer than the above-mentioned time, the antistatic properties of the resulting aromatic polyimide film hardly increase, while the physical properties of the film tend to deteriorate.

In the process for the preparation of the antistatic aromatic polyimide article (film) of the present invention, the above-mentioned organic polar solvent solution of an aromatic polyamic acid containing the antistatic agent can be partly or wholly replaced with an organic polar solvent solution of an aromatic polyimide containing the antistatic agent. Preferably employed as the organic solvent solution of an aromatic polyimide is an organic polar solvent solution of an aromatic polyimide obtained from the aforementioned aromatic diamine component and aromatic tetracarboxylic acid component. The organic polar solvent solution of the aromatic polyimide can be prepared by a known method. For example, the aromatic polyamic acid contained in the aromatic polyamic acid solution having been prepared as above may be subjected to imidation reaction, or an aromatic polyimide having been prepared separately from the aforementioned aromatic diamine component and aromatic tetracarboxylic acid component may be dissolved in an organic polar solvent.

Examples of the organic polar solvents employable for preparing the organic polar solvent solution of the aromatic polyimide include solvents capable of dissolving the aromatic polyimide such as N-methylpyrrolidone, pyridine, N,N-dimethylacetamide, N,N-diethylacetamide, dimethylsulfoxide, tetramethylurea, phenol, p-chlorophenol, m-chlorophenol, p-bromophenol, m-bromophenol, o-cresol, m-cresol, p-cresol, 3-chloro-6-hydroxytoluene, 2-chloro-4-hydroxytoluene, 2-chloro-5-hydroxytoluene, and 4-chloro-2-hydroxytoluene. These organic polar solvents can be employed singly or in combination.

The organic polar solvent solution of an aromatic polyimide preferably has a polymer content of 3 to 40 wt. %, more preferably 7 to 20 wt. %.

The aromatic polyimide contained in the above-mentioned solution preferably has a logarithmic viscosity (at 50° C., concentration: 0.5 g/100 ml of p-chlorophenol) of not less than 0.5, more preferably not less than 1.0.

The antistatic aromatic polyimide article of the invention can be prepared from the above-mentioned organic polar solvent solution of the aromatic polyimide containing the antistatic agent by any of known methods. For example, in the case of an antistatic aromatic polyimide film, the organic polar solvent solution of the aromatic polyimide containing the antistatic agent is filtrated and defoamed, and the solution is uniformly cast over an appropriate support such as a metallic drum and a metallic belt by means of a T-die. The solution cast over the support is then heated at a temperature of not higher than 200° C., preferably 60° to 60° C. to gradually remove the solvent. Thus, a self-supporting aromatic polyimide film can be prepared.

The self-supporting film obtained as above preferably has a heating loss (the same meaning as defined hereinbefore) of 5 to 60 wt. %, more preferably 7 to 55 wt. %.

The self-supporting film is then subjected to a heat treatment at a temperature of not lower than 300° C., preferably 300° to 550° C., more preferably 300° to 500° C.

As described hereinbefore with respect to the case of using the organic polar solvent solution of an aromatic polyamic acid, it is unfavorable to raise the temperature too rapidly in the heat treatment, because the solvent is removed from the film and imidation reaction proceeds by the time the temperature reaches the above-defined range. The time for the heat treatment preferably is in the range of 0.5 to 60 minutes. The heat treatment is preferably carried out at a temperature of not lower than 300° C. for not shorter than 2 minutes (particularly not shorter than 3 minutes), more preferably at a temperature of not lower than 350° C. for not shorter than 1 minute (particularly not shorter than 2 minutes). If the temperature for the heat treatment is lower than the above-mentioned temperature or the time therefor is shorter than the above-mentioned time, the antistatic properties of the resulting aromatic polyimide film markedly decrease. Even if the temperature for the heat treatment is higher than the above-mentioned temperature or the time therefor is longer than the above-mentioned temperature time, the antistatic properties of the resulting aromatic polyimide film hardly increase, while the physical properties of the film tend to deteriorate.

It is not always required that the antistatic agent is uniformly distributed in the antistatic aromatic polyimide article of the present invention. The aromatic polyimide article can show excellent antistatic properties, provided that the antistatic agent is contained at least in the vicinity of the surface of the article. Accordingly, the antistatic aromatic polyimide article (e.g., film) of the invention can be also prepared, for example, by coating any one of a solution containing the antistatic agent, a solution containing the antistatic agent and an aromatic polyamic acid and a solution containing the antistatic agent and an aromatic polyimide onto a surface of the aforementioned self-supporting film, and then subjecting the film with the coated layer to the drying procedure and the heat treatment.

Further, a article of an aromatic polyimide or other resin containing no antistatic agent can be made antistatic by coating or laminating the antistatic aromatic polyimide article (e.g., film) of the invention thereon by an appropriate means.

As a concrete example of the antistatic aromatic polyimide article of the invention, there can be mentioned an antistatic aromatic polyimide film having thickness of 5 to 20 $\mu$m, tensile strength of approx. 15 to 50 kg/mm$^2$ and elongation of 5 to 150%.

The present invention is further illustrated by the following examples.

In each of the following examples, the term "viscosity" simply referred to means a viscosity of an aromatic polyamic solution or an aromatic polyimide solution measured by a viscometer of Bismetron USA type (produced by Shibaura System Co., Ltd.). The term "surface resistivity" means a surface resistivity of the aromatic polyimide film measured by HIGH RESISTANCE METER (trade name, produced by Yokogawa Huret Paccard Co., Ltd.).

REFERENCE EXAMPLE 1

To 2,470 g. of N,N-dimethylacetamide were added 294.22 g. of 3,3',4,4'-biphenyltetracarboxylic dianhydride and 108.14 g. of p-phenylenediamine to perform polymerization reaction at room temperature for approx. 10 hours, to prepare a polyamic acid solution. The obtained polyamic acid solution had a logarithmic viscosity of 2.10 and a viscosity of 130 Pa.S at 30° C.

REFERENCE EXAMPLE 2

To 3,037 g. of N,N-dimethylacetamide were added 294.22 g. of 3,3',4,4'-biphenyltetracarboxylic dianhydride and 200.24 g. of 4,4'-diaminodiphenylether to perform polymerization reaction at room temperature for approx. 10 hours, to prepare a polyamic acid solution. The obtained polyamic acid solution had a logarithmic viscosity of 1.50 and a viscosity of 110 Pa.S at 30° C.

REFERENCE EXAMPLE 3

To 2,570 g. of N,N-dimethylacetamide were added 200.24 g. of 4,4'-diaminodiphenyl ether and 218.12 g. of pyromellitic dianhydride to perform polymerization reaction for approx. 6 hours, to prepare a polyamic acid solution. The obtained polyamic acid solution had a logarithmic viscosity of 1.60 and a viscosity of 30 Pa.S at 30° C.

REFERENCE EXAMPLE 4

To 114.6 g. of p-chlorophenol heated at 60° C. were added 7.356 g. of 3,3',4,4'-biphenyltetracarboxylic dianhydride and 5.006 g. of 4,4'-diaminodiphenyl ether, and the obtained solution was heated to 180° C. for 1 hour in a nitrogen atmosphere under stirring the solution. The solution was allowed to stand at 180° C. for 1 hour to perform polymerization reaction. Thus, a polyimide solution was obtained. The obtained polyimide solution had a logarithmic viscosity of 0.66 and a viscosity of 6 Pa.S at 100° C.

EXAMPLES 1-22 AND COMPARISON EXAMPLES 1-3

To the polyamic acid solution obtained in Reference Example 1 was added a compound (an antistatic agent) set forth in Table 1 in the amount also set forth in Table 1 per 100 parts by weight of the polymer contained in the polyamic acid solution, and the obtained solution was stirred at room temperature for 1 hour to prepare a polyamic acid solution composition. The composition was cast over a glass plate in such a manner that the composition on the glass plate would have thickness of 0.4 mm, and the composition was dried by applying a hot air at 130° C. for 30 minutes to form a self-supporting film on the glass plate. The self-supporting film was then separated (peeled off) from the glass plate. Thereafter, the self-supporting film was subjected to a heat treatment which comprised heating the film from 100° to 300° C. for 20 minutes, further heating from 300° to 400° C. for 10 minutes and furthermore heating from 400° to 450° C. for 10 minutes, to prepare an aromatic polyimide film.

The aromatic polyimide film obtained in each of Examples 1 to 22 was a film of high strength showing tensile strength of not less than 25 kg/mm² and elongation of 20 to 50%.

The aromatic polyimide film having thickness of 25 to 30 μm obtained as above was allowed to stand for not shorter than 2 hours in a thermostatt where the temperature and the humidity were kept at 23°±1° C. and 65±5%RH, respectively, and within 5 hours the aromatic polyimide film was measured on the surface resistivity in the same atmosphere.

The results are set forth in Table 1, in which the results on other aromatic polyimide films obtained by adding the antistatic agent in an amount other than the range specified by the present invention or adding no antistatic agent are also set forth as Comparison Examples 1 to 3.

TABLE 1

|  | Antistatic Agent | Amount [part(s) by weight] | Surface Resistivity (ohm) |
|---|---|---|---|
| Example 1 | sodium benzenesulfinate | 10 | $10^8$ |
| Example 2 | sodium benzenesulfinate | 5 | $10^9$ |
| Example 3 | sodium benzenesulfinate | 1 | $10^{10}$ |
| Example 4 | sodium benzenesulfinate | 0.5 | $10^{10}$ |
| Example 5 | sodium benzenesulfinate | 0.1 | $10^{10}$ |
| Example 6 | sodium benzenesulfinate | 0.05 | $10^{11}$ |
| Example 7 | sodium benzenesulfinate | 0.01 | $10^{12}$ |
| Com. Ex. 1 | sodium benzenesulfinate | 0.005 | $10^{15}$ |
| Example 8 | sodium benzenesulfonate | 10 | $10^8$ |
| Example 9 | sodium benzenesulfonate | 5 | $10^9$ |
| Example 10 | sodium benzenesulfonate | 1 | $10^{10}$ |
| Example 11 | sodium benzenesulfonate | 0.5 | $10^{10}$ |
| Example 12 | sodium benzenesulfonate | 0.1 | $10^{10}$ |
| Example 13 | sodium benzenesulfonate | 0.05 | $10^{11}$ |
| Example 14 | sodium benzenesulfonate | 0.01 | $10^{12}$ |
| Com. Ex. 2 | sodium benzenesulfonate | 0.005 | $10^{15}$ |
| Example 15 | sodium p-toluenesulfinate | 1 | $10^{10}$ |
| Example 16 | sodium p-toluenesulfinate | 0.1 | $10^{10}$ |
| Example 17 | sodium p-toluenesulfonate | 1 | $10^{10}$ |
| Example 18 | sodium p-toluenesulfonate | 0.1 | $10^{10}$ |
| Example 19 | lithium p-toluenesulfonate | 1 | $10^{10}$ |
| Example 20 | lithium p-toluenesulfonate | 0.1 | $10^{10}$ |
| Example 21 | sodium 1-naphthalenesulfonate | 1 | $10^{10}$ |
| Example 22 | sodium 1-naphthalenesulfonate | 0.1 | $10^{10}$ |
| Com. Ex. 3 | none | — | over $10^{16}$ |

EXAMPLES 23-36 AND COMPARISON EXAMPLE 4

To the polyamic acid solution obtained in Reference Example 2 was added an antistatic agent set forth in Table 2 in the amount also set forth in Table 2 per 100 parts by weight of the polymer contained in the polyamic acid solution, and the obtained solution was stirred at room temperature for 1 hour to prepare a polyamic acid solution composition. The composition was cast over a glass plate in the same manner as described in Example 1, and the composition was dried by applying a hot air at 130° C. for 30 minutes to form a self-supporting film on the glass plate. The self-supporting film was then separated (peeled off) from the glass plate. Thereafter, the self-supporting film was subjected to a heat treatment which comprised heating the film from 200° to 350° C. for 15 minutes and further heating from 350° to 450° C. for 15 minutes, to prepare an aromatic polyimide film.

Each of the aromatic polyimide films obtained in Examples 23 to 36 was a film of high strength showing tensile strength of 18 to 20 kg/mm² and elongation of 80 to 100%.

Each of the aromatic polyimide films obtained as above was measured on the surface resistivity in the same manner as described in Example 1.

The results are set forth in Table 2, in which the result on other aromatic polyimide film obtained by adding no antistatic agent is also set forth as Comparison Example 4.

TABLE 2

| | Antistatic Agent | Amount [part(s) by weight] | Surface Resistivity (ohm) |
|---|---|---|---|
| Example 23 | sodium benzenesulfinate | 1 | $10^{10}$ |
| Example 24 | sodium benzenesulfinate | 0.1 | $10^{10}$ |
| Example 25 | sodium benzenesulfonate | 1 | $10^{10}$ |
| Example 26 | sodium benzenesulfonate | 0.1 | $10^{10}$ |
| Example 27 | sodium p-toluenesulfinate | 1 | $10^{10}$ |
| Example 28 | sodium p-toluenesulfinate | 0.1 | $10^{10}$ |
| Example 29 | sodium p-toluenesulfonate | 1 | $10^{10}$ |
| Example 30 | sodium p-toluenesulfonate | 0.1 | $10^{10}$ |
| Example 31 | lithium p-toluenesulfonate | 1 | $10^{10}$ |
| Example 32 | lithium p-toluenesulfonate | 0.1 | $10^{10}$ |
| Example 33 | sodium 1-naphthalenesulfonate | 1 | $10^{10}$ |
| Example 34 | sodium 1-naphthalenesulfonate | 0.1 | $10^{10}$ |
| Example 35 | sodium 1,5-naphthalene-disulfonate | 1 | $10^{10}$ |
| Example 36 | sodium 1,5-naphthalene-disulfonate | 0.1 | $10^{10}$ |
| Com. Ex. 4 | none | — | over $10^{16}$ |

EXAMPLES 37-38 AND COMPARISON EXAMPLE 5

To the polyamic acid solution obtained in Reference Example 3 was added an antistatic agent set forth in Table 3 in the amount also set forth in Table 3 per 100 parts by weight of the polymer contained in the polyamic acid solution, and the obtained solution was stirred at room temperature for 1 hour to prepare a polyamic acid solution composition. The composition was cast over a glass plate in the same manner as described in Example 1, and the composition was dried by applying a hot air at 130° C. for 30 minutes to form a self-supporting film on the glass plate. The self-supporting film was then separated (peeled off) from the glass plate. Thereafter, the self-supporting film was subjected to a heat treatment which comprised heating the film from 200° to 300° C. for 15 minutes and further heating from 300° to 380° C. for 20 minutes, to prepare an aromatic polyimide film.

Each of the aromatic polyimide films obtained in Examples 37 and 38 was a film of high strength showing tensile strength of 15 to 20 kg/mm² and elongation of 60 to 80%.

Each of the aromatic polyimide films obtained as above was measured on the surface resistivity in the same manner as described in Example 1.

The results are set forth in Table 3, in which the result on other aromatic polyimide film obtained by adding no antistatic agent is also set forth as Comparison Example 5.

TABLE 3

| | Antistatic Agent | Amount [part by weight] | Surface Resistivity (ohm) |
|---|---|---|---|
| Example 37 | sodium benzenesulfinate | 1 | $10^{10}$ |
| Example 38 | sodium benzenesulfonate | 1 | $10^{10}$ |
| Com. Ex. 5 | none | — | over $10^{16}$ |

EXAMPLES 39-40 AND COMPARISON EXAMPLE 6

To the polyimide solution obtained in Reference Example 4 was added an antistatic agent set forth in Table 4 in the amount also set forth in Table 4 per 100 parts by weight of the polymer contained in the polyimide solution, and the obtained solution was stirred at room temperature for 1 hour to prepare a polyimide solution composition. The composition was cast over a glass plate and dried by a hot air in the same manner as described in Example 1 to form a self-supporting film on the glass plate. The self-supporting film was peeled off from the glass plate and then subjected to the same heat treatment as that of Example 1, to prepare an aromatic polyimide film.

Each of the aromatic polyimide films obtained in Examples 39 and 40 was a film of high strength showing tensile strength of 20 to 23 kg/mm² and elongation of 90 to 120%.

Each of the aromatic polyimide films obtained as above was measured on the surface resistivity in the same manner as described in Example 1.

The results are set forth in Table 4, in which the result on other aromatic polyimide film obtained by adding no antistatic agent is also set forth as Comparison Example 6.

COMPARISON EXAMPLE 7

The procedures of Example 3 were repeated except for subjecting the self-supporting film to a heat treatment comprising heating the film from 100° to 300° C. for 20 minutes, to prepare an aromatic polyimide film. The obtained aromatic polyimide film was measured on the surface resistivity in the same manner as described in Example 1. The result is set forth in Table 4.

TABLE 4

| | Compound | Amount [part by weight] | Surface Resistivity (ohm) |
|---|---|---|---|
| Example 39 | sodium benzenesulfinate | 0.1 | $10^{10}$ |
| Example 40 | sodium benzenesulfonate | 0.1 | $10^{10}$ |
| Com. Ex. 6 | none | — | over $10^{16}$ |
| Com. Ex. 7 | sodium benzenesulfinate | 1.0 | over $10^{16}$ |

EXAMPLES 41-42 AND COMPARISON EXAMPLE 8

To the polyamic acid solution obtained in Reference Example 1 was added a compound set forth in Table 5 as an antistatic agent in the amount also set forth in Table 5 per 100 parts by weight of the polymer contained in the polyamic acid solution, and the obtained solution was stirred at room temperature for 1 hour to prepare a polyamic acid solution composition. The composition was cast over a glass plate and dried by a hot air in the same manner as stated in Example 1 to form a self-supporting film on the glass plate. The self-supporting film was peeled off from the glass plate and then subjected to the same heat treatment as that of Example 1, to prepare an aromatic polyimide film.

Each of the aromatic polyimide films obtained in Examples 41 and 42 showed high strength such as tensile strength of 30 to 35 kg/mm² and elongation of 25 to 30%.

Each of the aromatic polyimide films obtained as above was measured on the surface resistivity in the same manner as described in Example 1. The aromatic polyimide film was further allowed to stand in the aforementioned thermostatt for a period of time (i.e., elapsed time) set forth in Table 5 at the end of which the surface resistivity of the film was measured. The results are set forth in Table 5.

In Table 5, the result of other aromatic polyimide film obtained by adding no antistatic agent is also set forth as Comparison Example 8.

TABLE 5

|  | Antistatic Agent | Elapsed Time [day(s)] | Surface Resistivity (ohm) |
|---|---|---|---|
| Example 41 | sodium benzenesulfinate | 0 | $10^{10}$ |
|  |  | 1 | $10^{10}$ |
|  |  | 7 | $10^{10}$ |
|  |  | 30 | $10^{10}$ |
|  |  | 180 | $10^{10}$ |
| Example 42 | sodium benzenesulfonte | 0 | $10^{10}$ |
|  |  | 1 | $10^{10}$ |
|  |  | 7 | $10^{10}$ |
|  |  | 30 | $10^{10}$ |
|  |  | 180 | $10^{10}$ |
| Com. Ex. 8 | none | 0 | over $10^{16}$ |
|  |  | 1 | over $10^{16}$ |
|  |  | 7 | over $10^{16}$ |
|  |  | 30 | over $10^{16}$ |
|  |  | 180 | over $10^{16}$ |

We claim:

1. A process for the preparation of an antistatic aromatic polyimide article comprising an aromatic polyimide and an antistatic agent in an amount of 0.01 to 10 parts by weight based on 100 parts by weight of the aromatic polyimide, said antistatic agent being selected from the group consisting of a sulfonate having the formula (I):

$$R(SO_3M)_n \quad (I)$$

wherein R is an unsubstituted aryl group or an aryl group having a lower alkyl substituent having 1–4 carbon atoms, M is an alkali metal; and n is 1 or 2; and a sulfinate having the formula (II):

$$RSO_2M \quad (II)$$

wherein R and M have the same meanings as defined above; which comprises the steps of:

coating a composition comprising a polyamic acid prepared from an aromatic diamine component and an aromatic tetracarboxylic acid component, the antistatic agent and an organic solvent over a support to form a composition layer containing 5 to 60wt. % of the solvent;

removing solvent by heating to a temperature of not higher than 200° C., removing the composition layer from the support; and heating the composition layer to a temperature of not lower than 300° C. to perform ring-closure and imidation reaction.

2. The process as claimed in claim 1, wherein said aromatic polyimide article is an aromatic polyimide film.

3. The process as claimed in claim 1, wherein R is phenyl or methylphenyl.

4. The process as claimed in claim 1, wherein R is naphthyl.

5. The process as claimed in claim 1, wherein M is sodium or lithium.

6. The process as claimed in claim 5, wherein said antistatic agent is a sulfonate having the formula (I).

7. The process as claimed in claim 5, wherein said antistatic agent is a sulfonate having the formula (II).

8. The process as claimed in claim 5, wherein R is phenyl, methylphenyl or naphthyl.

* * * * *